United States Patent [19]
Chen

[11] Patent Number: 5,664,601
[45] Date of Patent: Sep. 9, 1997

[54] RELIEF VALVE WITH ABNORMAL PRESSURE INDICATOR MEANS

[76] Inventor: Lin-Shen Chen, 9F, No. 14, Hua San St., Jen Ai Ward, Chi Lung, Taiwan

[21] Appl. No.: 783,548

[22] Filed: Jan. 14, 1997

[51] Int. Cl.[6] .................................................. F16K 37/00
[52] U.S. Cl. .......................... 137/551; 137/522; 137/542; 116/277
[58] Field of Search ............................ 137/542, 551, 137/522; 116/272, 277

[56] References Cited

U.S. PATENT DOCUMENTS

| 600,884 | 3/1898 | Moon | 116/277 |
|---|---|---|---|
| 4,168,723 | 9/1979 | Schneider | 137/522 |
| 5,078,078 | 1/1992 | Cuk | 116/272 |

FOREIGN PATENT DOCUMENTS 526296   8/1985   Italy ........................................ 137/551

*Primary Examiner*—A. Michael Chambers
*Attorney, Agent, or Firm*—Morton J. Rosenberg; David I. Klein

[57] ABSTRACT

A relief valve with abnormal pressure indicator means, including a valve rod with a valve flap moved in a casing to close/open the passage, a cap mounted on the valve rod outside the casing, and an indicator coupled to the valve rod and having a display face shaded by the cap, the indicator being forced to fall by the weight of a weight when the valve flap is forced to open the passage by an abnormal high pressure, causing the display of the indicator to be shown.

1 Claim, 8 Drawing Sheets

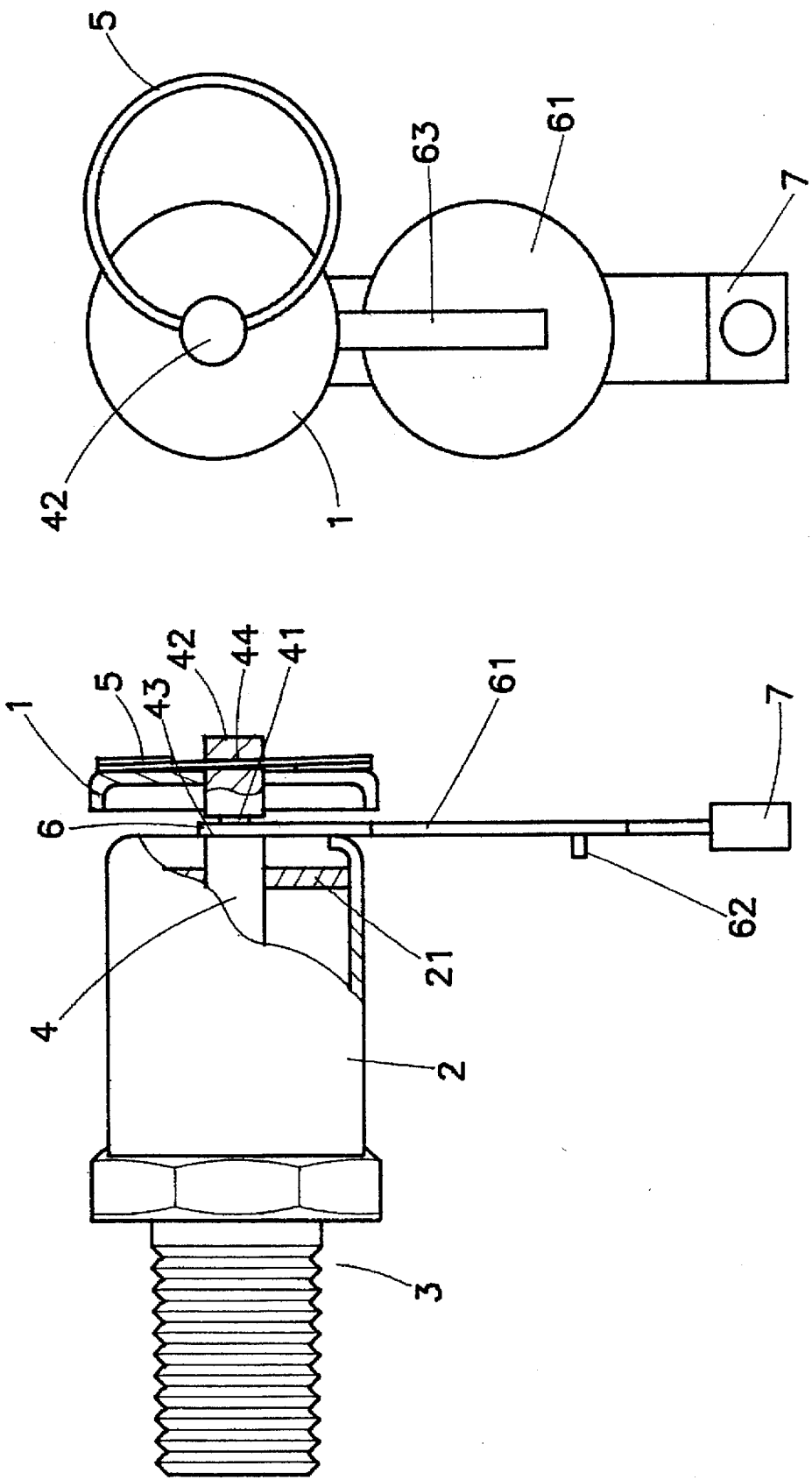

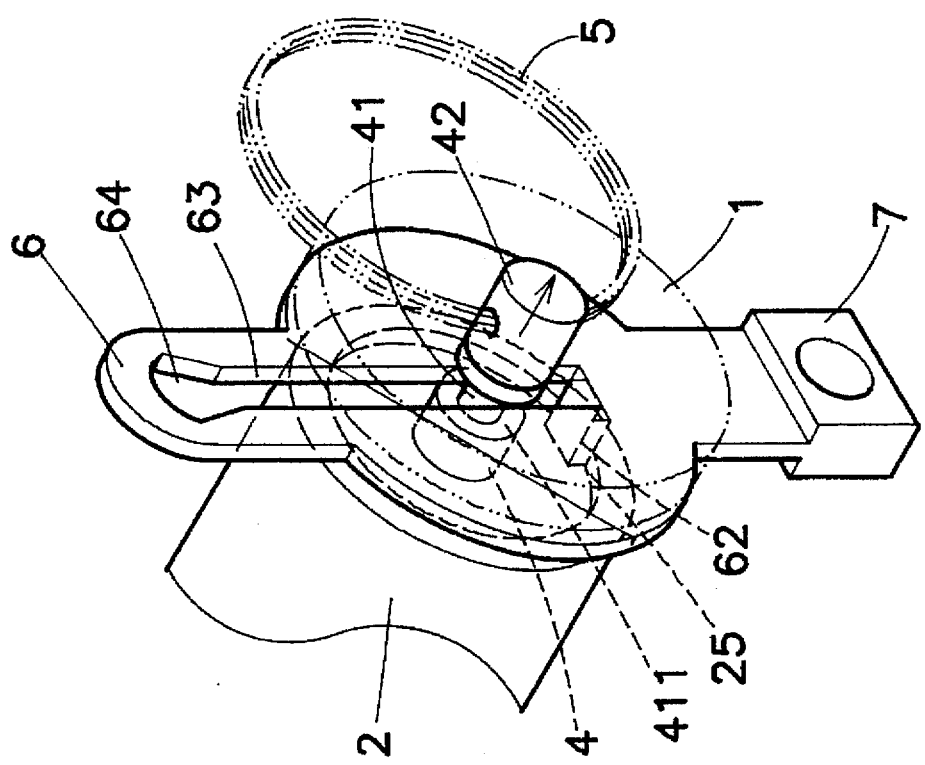

RELIEF VALVE WITH ABNORMAL PRESSURE INDICATOR MEANS

BACKGROUND OF THE INVENTION

The present invention relates to relief valves, and more particularly to such a relief valve which automatically pulls down an indicator with display face out of the shade of a cap when it is opened by an abnormal pressure. It won't affect the function of releasing abnormal pressure of the relief valves when the indicator was shown, and the indicator can be reset for the next warning.

A variety of apparatus including transformers, oil tanks, oil reservoirs, gas tanks, oil pipes, etc. may be equipped with a relief valve for releasing excessive pressure. If the inside pressure of an enclosed apparatus is continuously increased, the apparatus may be caused to explode. Regular relief valves for, this purpose do not produce any signal to notify the maintenance persons when they had been already actuated to release pressure. Therefore, maintenance presons cannot quickly find the reason when an excessive high pressure happens.

SUMMARY OF THE INVENTION

It is one object of the present invention to provide a relief valve which automatically gives a signal for warning when it is actuated to release pressure. It is another object of the present invention to provide a relief waive with abnormal pressure display means which is inexpensive to manufacture, without any power supply, reliable and safe in use. According to the present invention, the relief valve comprises a valve rod with a valve flap moved in a casing to close/open the passage of the casing, a cap mounted on the valve rod outside the casing, and a indicator coupled to the valve rod and having a display face shaded by the cap. The indicator is forced to fall by the weight of a weight when the valve flap is forced to open the passage by an abnormal high pressure from the apparatus in which the relief valve is installed, causing the display face of the indicator to be moved away from the shade of the cap and shown.

BRIEF DESCRIPTION OF THE DRAWINGS

FIG. 2A is similar to FIG. 1A but showing the retainer rod of the display plate disconnected from the casing, and the indicator fallen;

FIG. 2B is a front view of FIG. 2A;

FIG. 4B is a perspective view of FIG. 4A;

DETAILED DESCRIPTION OF THE PREFERRED EMBODIMENT

Figure 1B:
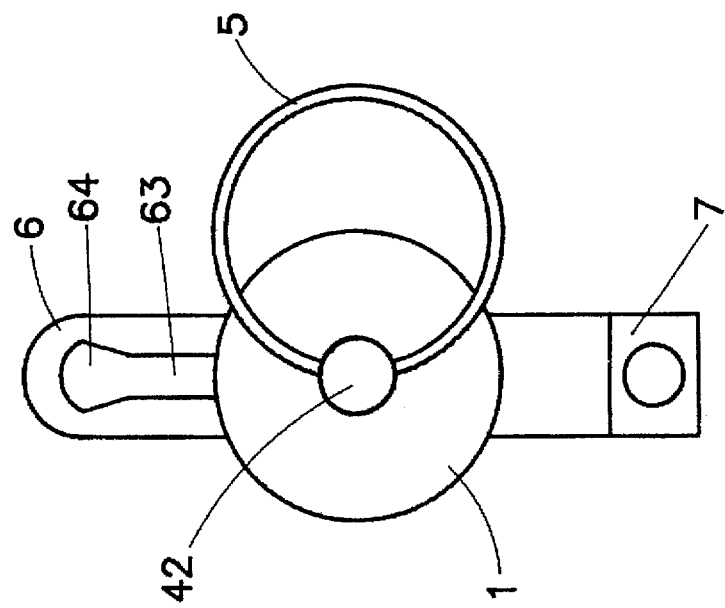
FIG. 1B is a front view of the relief valve shown in FIG. 1A.
Figure 1A:
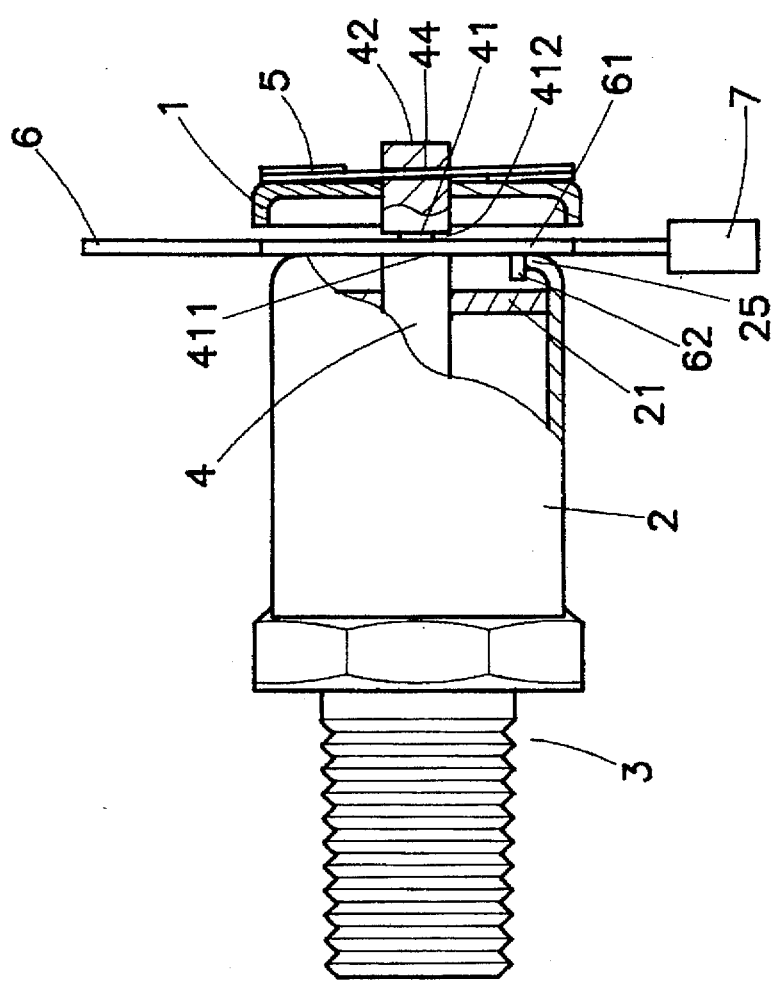
FIG. 1A shows a relief valve on normal position according to the present invention.

Referring to FIGS. 1A and 1B, a relief valve in accordance with the present invention is generally comprised of a cap 1, an indicator 6, a casing 2 having a rear coupling screw section 3. The casing 2 has a fixed front mount 21, which holds a valve rod 4. The valve rod 4 is moved in a hole (not shown) in the fixed front mount 21, having a front end 42 inserted through the center hole 11 (not shown) of the cap 1 and coupled with a pull ring 5, and a neck 41 spaced behind the front end 42. The front end 42 of the valve rod 4 has a through hole 44. The pull ring 5 is hung on the through hole 44 of the front end 42 of the valve rod 4. The indicator 6 has a colored display face 61 in the middle, a retainer rod 62 rasied from back of the colored display face 61, an elongated guide slot 63 coupled to the neck 41 of the valve rod 4 and having a top end terminating in an expanded hanging hole 64, and a weight 7 at the bottom side. Normally, the retainer rod 62 is inserted into the front end-of the casing 2 and stopped at the rim 25 thereof, and the colored display face 61 is shaded by the cap 1. The width of the annular gap 412 around the neck 41 is shorter than the length of the retainer rod 62 to limit the retainer rod 62 and keep stopped at the rim 25 on normal position. When the valve rod 4 is extended out, the shoulder 441 at the inner end of the neck 41 is moved to force the indicator 6 forwards.

Referring to FIGS. 2A and 2B, when the valve rod 4 is extended outwards, the retainer rod 62 is forced away from the rim 25 of the casing 2. When the retainer rod 62 is disengaged from the rim 25 of the casing 2, the indicator 6 is forced by the weight of the weight 7 to fall, and therefore the colored display face 61 is moved out of the shade of the cap 1. The displace face 61 is preferably colored with red color for warning.

Figure 3:
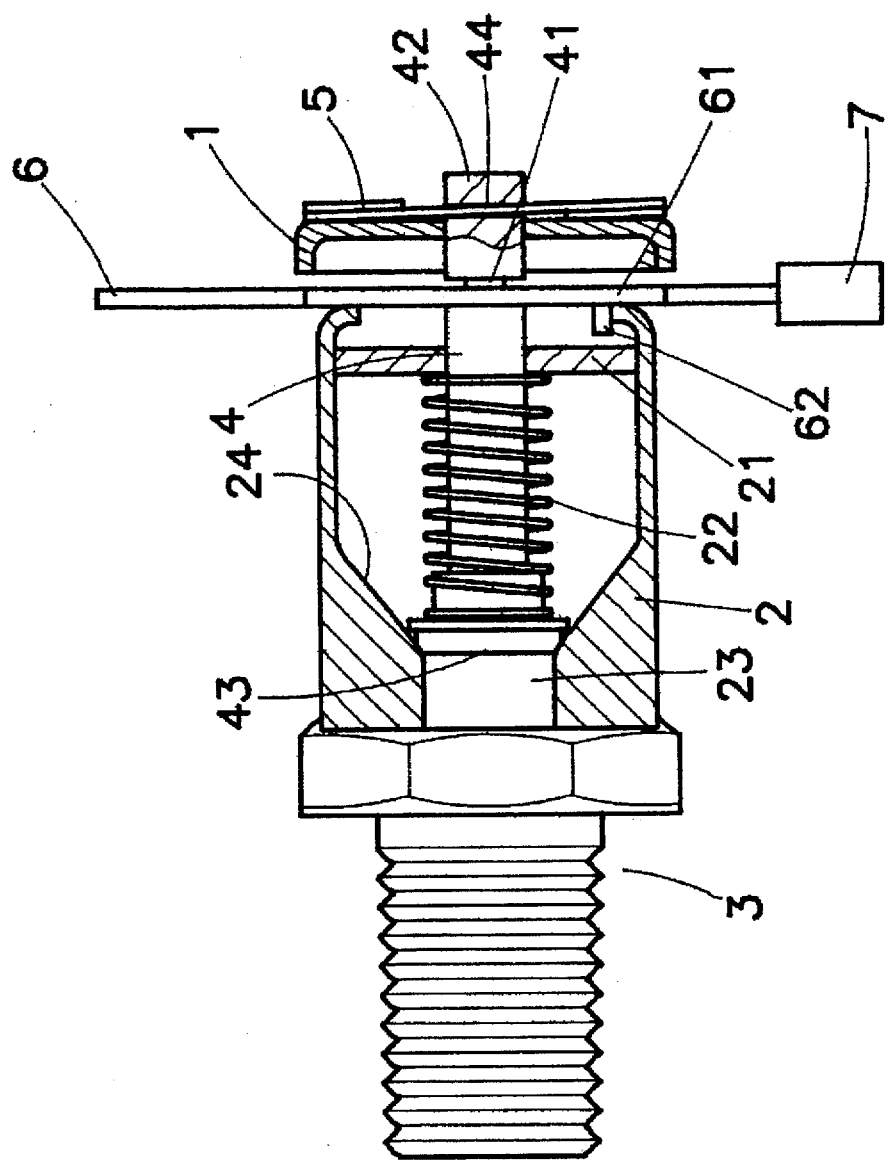
FIG. 3 is a side view in section of the relief valve of the present invention, showing the valve flap closed on the rear center through hole.

Referring to FIG. 3, the casing 2 has a rear center through hole 23 through the axial center of the rear coupling screw section 3, and a tapered inside wall 24 gradually reducing toward the rear center through hole 23. The rear end of the valve rod 4 is fixedly coupled with a valve flap 43. A spring 22 is mounted around the valve rod 4 and stopped between the valve flap 43 and the front mount 21. The spring 22 imparts a pressure to the valve flap 43, causing it to close the rear center through hole 23.

Figure 4A:
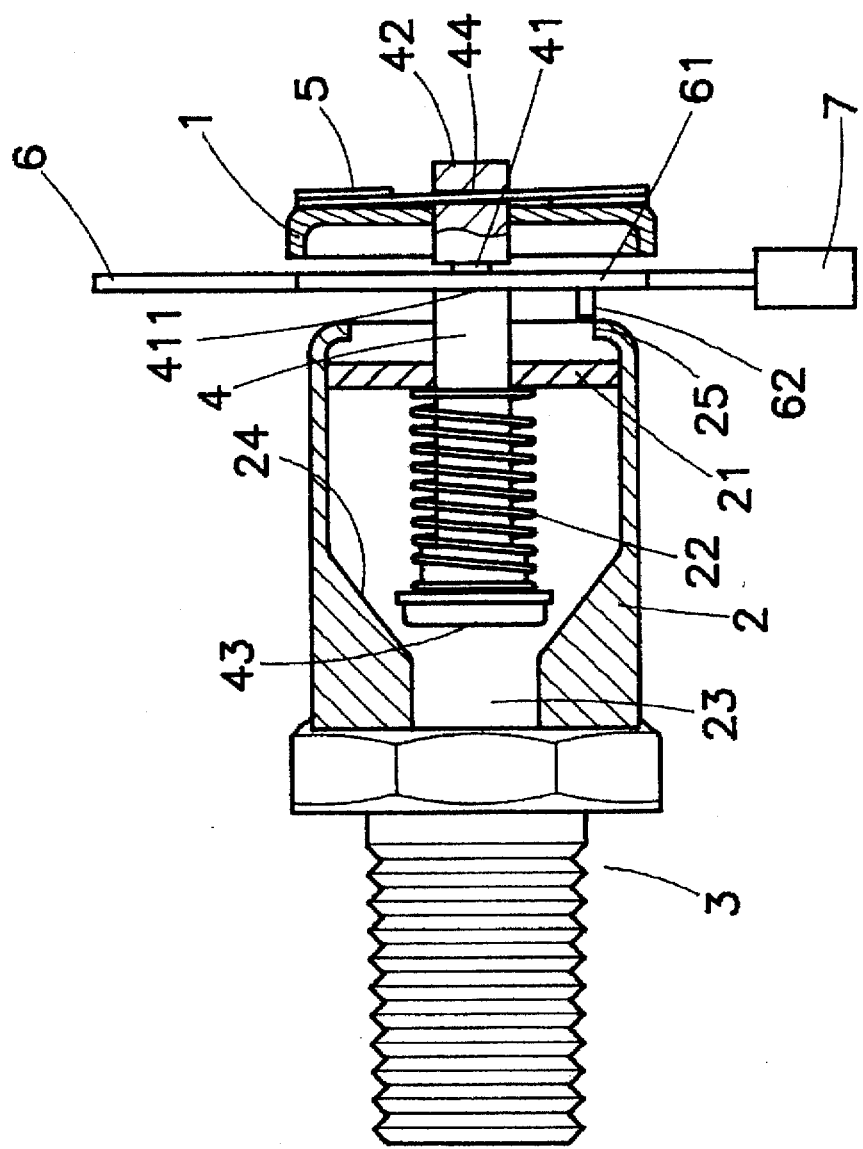
FIG. 4A is similar to FIG. 3 but showing the valve flap moved forwards, and the rear, center through hole opened.
Figure 5:
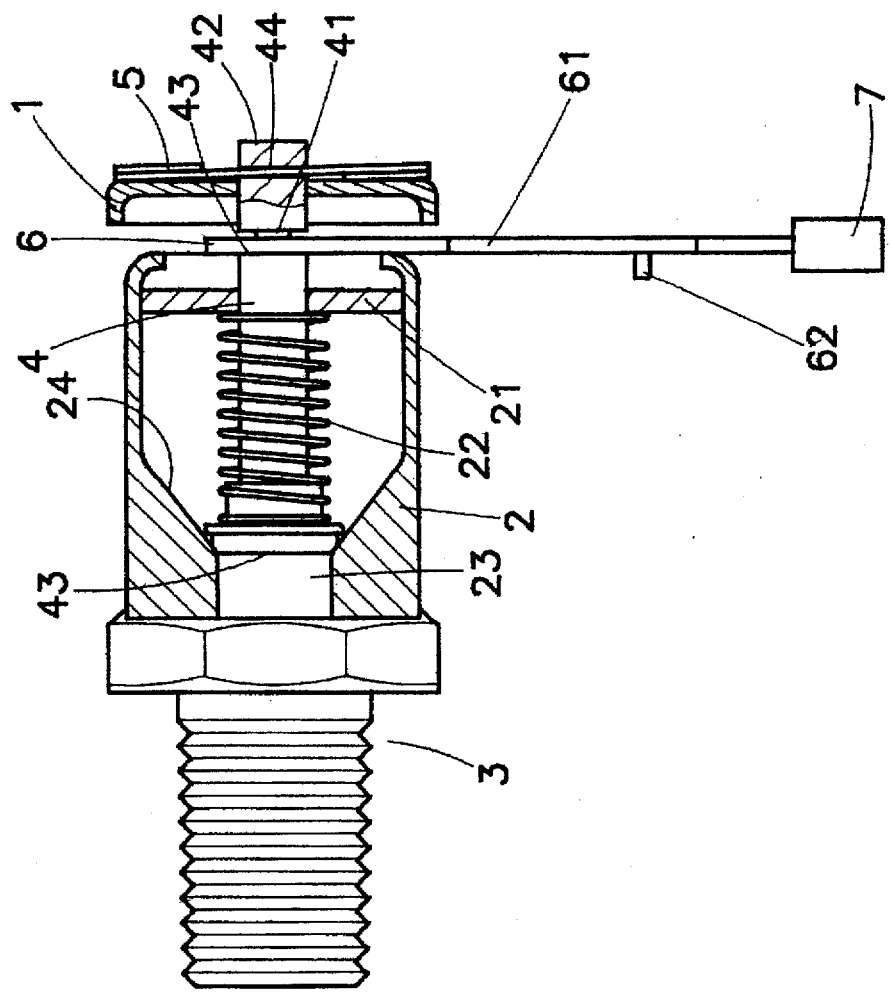
FIG. 5 is another sectional view of the present invention, showing the valve flap closed on the rear center through hole, and the indicator fallen.

Referring to FIGS. 4A, 4B and 5, when the inside pressure of the object to which the rear coupling screw section 3 of the casing 2 is connected surpasses the spring force of the spring 22, the valve flap 43 is forced outwards to open the rear center through hole 23 for permitting excessive pressure to be released out of the casing 2, and at the same time the indicator 6 is forced forwards by the shoulder 411 of the neck 41 of the valve rod 4, causing the retainer rod 62 to be disconnected from the rim 25 of the casing 2, and therefore the colored display face 61 is moved downwardly out of the shade of the cap 1. When the pressure is balanced, the valve flap 43 is forced backwards by the spring 22 to close the rear center through hole 23 again.

Figure 6:
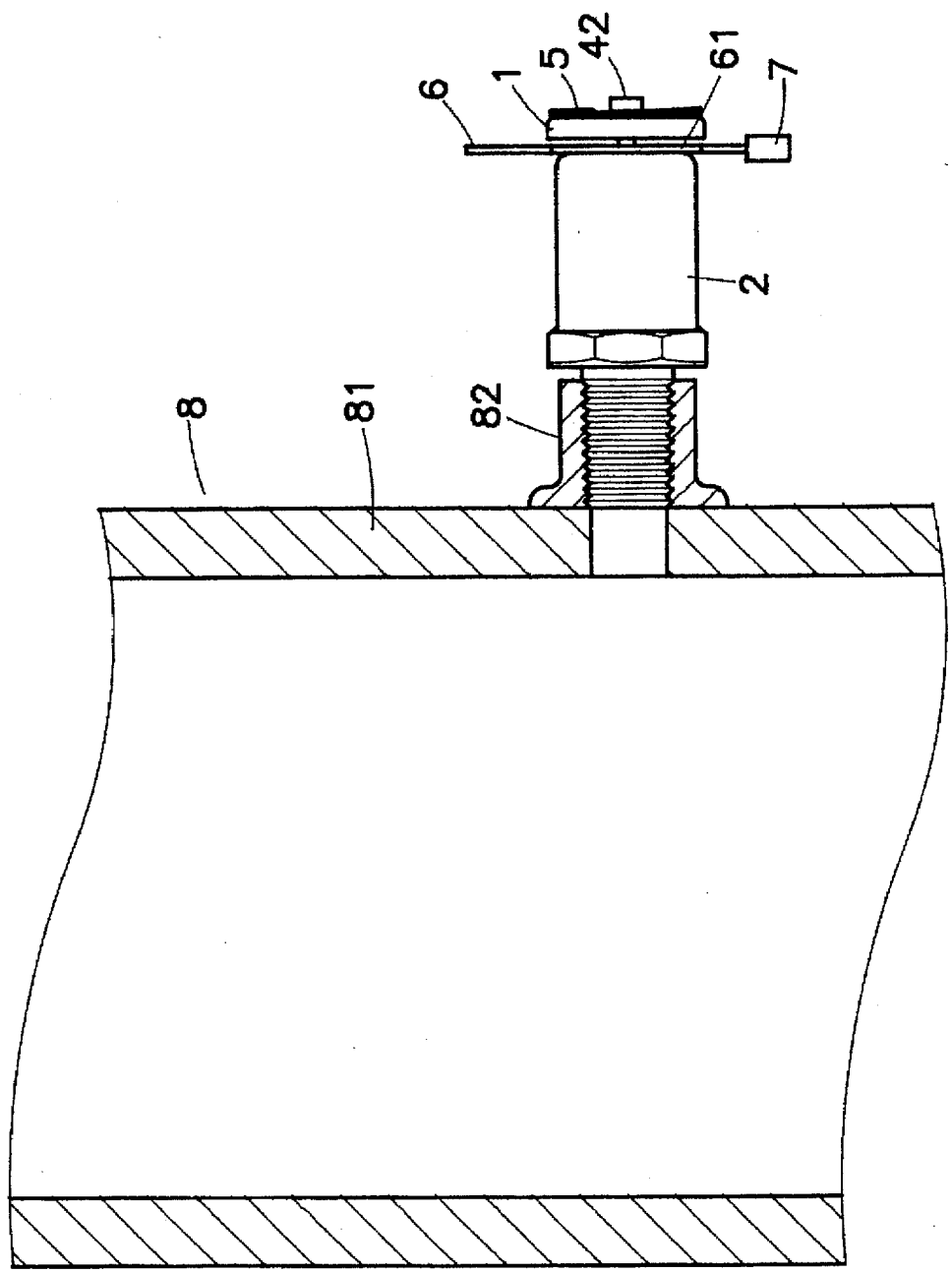
FIG. 6 is an applied view of the present invention, showing the relief valve installed in an exhaust port of a transformer; and, FIG. 7 is similar to FIG. 6 but showing the indicator fallen.
Figure 7:
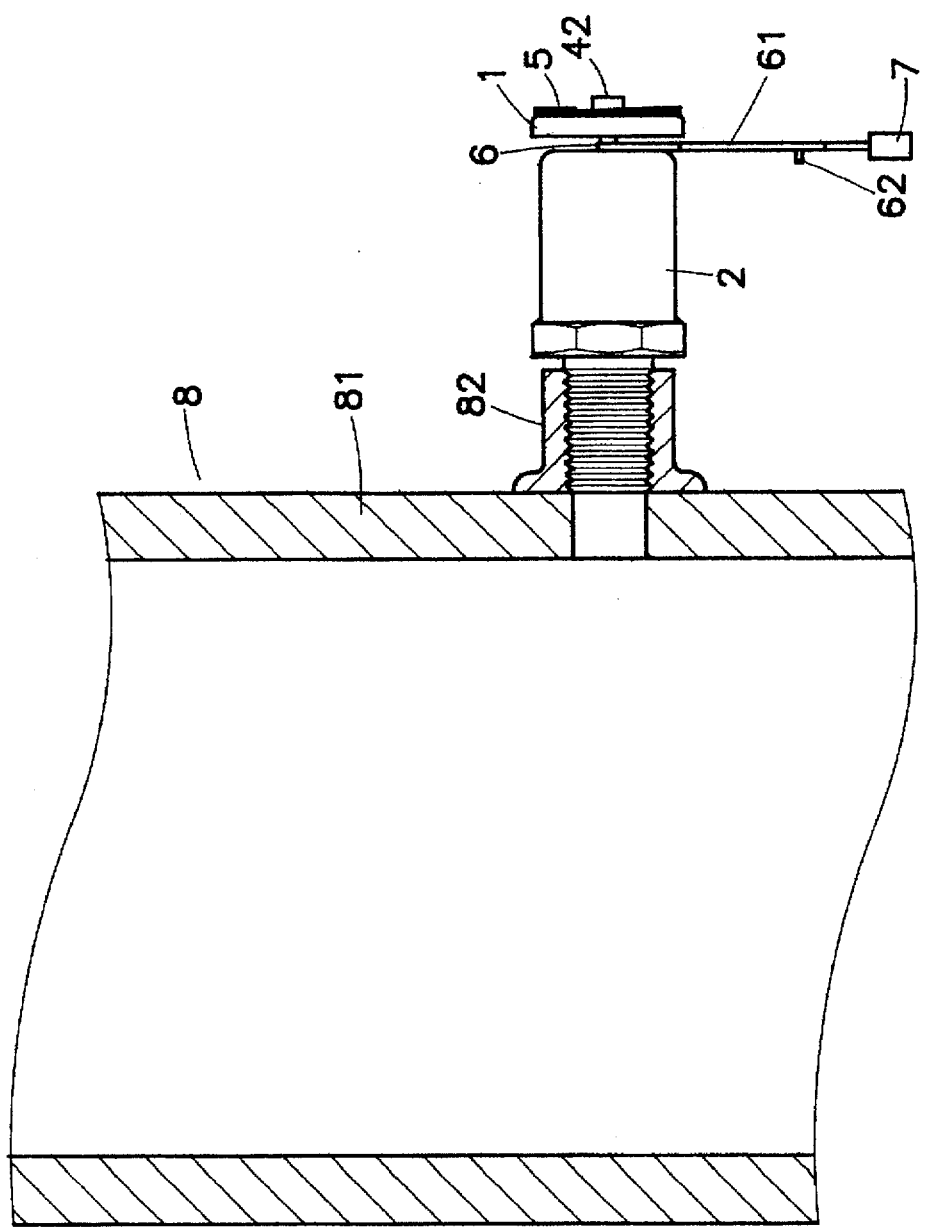

Referring to FIGS. 6 and 7, the relief valve is installed in an exhaust port 82 in the wall 81 of an object for example a transformer 8. When the inside pressure of the transformer 8 surpasses a predetermined level, the relief valve immediately opens the passage, permitting excessive pressure (gas) to be released from the exhaust port 82. When the passage of the exhaust port 82 is opened, the displace face 61 is simultaneously moved away from the shade of the cap 1 for indication. Furthermore, during a maintenance work, the maintenance engineer can pull the pull ring 5 to open the exhaust port 82 manually, permitting the inside pressure of the transformer 8 to be released through the exhaust port 82.

It is to be understood that the drawings are designed for purposes of illustration only, and are not intended as a definition of the limits and scope of the invention disclosed.

What the invention claimed is:

1. A relief valve comprising:

a casing having a rear coupling screw section adapted for fastening to an object, a rear center through hole defined within said rear coupling screw section and disposed in communication with the inside of the object, a tapered inside wall gradually reducing toward said rear center through hole, a front rim, and a front mount on the inside between said front rim and said tapered inside wall, said front mount having a through hole;

a valve rod moved in the through hole of said front mount, said valve rod having a front end disposed outside said casing, a rear end, a neck spaced between said front end and said rear end and disposed outside said front rim, and a shoulder at an inner end of said neck;

a valve flap fixedly connected to the rear end of said valve rod and adapted for closing the rear center through hole of said casing;

spring means mounted around said valve rod and stopped between said valve flap and said front mount, said spring means imparting a backward pressure to said valve flap, causing it to close the rent center through hole of said casing;

a cap mounted on the front end of said valve rod; and, an indicator mounted around the neck of said valve rod and spaced between said cap and the front rim of said casing, said indicator having a display face, a weight at a bottom side thereof, an elongated guide slot in the middle coupled to the neck of said valve rod, and a retainer rod raised from a back side of said display face, said retainer rod being inserted into said casing and supported on the front rim of said casing to hold said indicator in a first position in which said display face is shaded by said cap, said retainer rod being disconnected from the front rim of said casing when said valve flap is forced outwards to open the rear center through hole of said casing by a pressure from said object and to force the shoulder of said valve neck forwardly against both side of said elongated guide slot of said indicator, thereby causing said indicator to be forced downwards by the weight of said weight to a second position in which said display face is moved out of the shade of said cap.

* * * * *